United States Patent Office 3,548,448
Patented Dec. 22, 1970

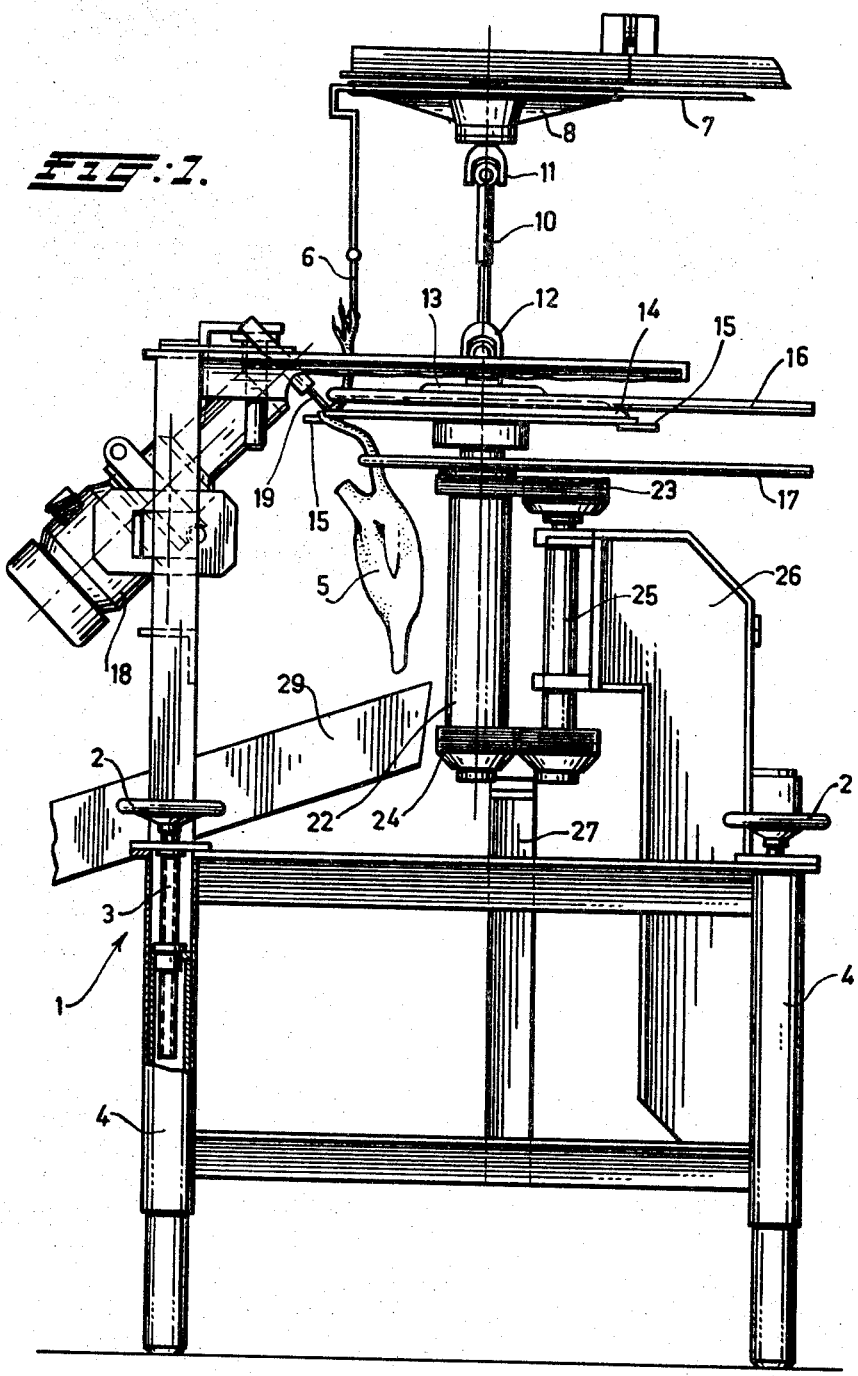

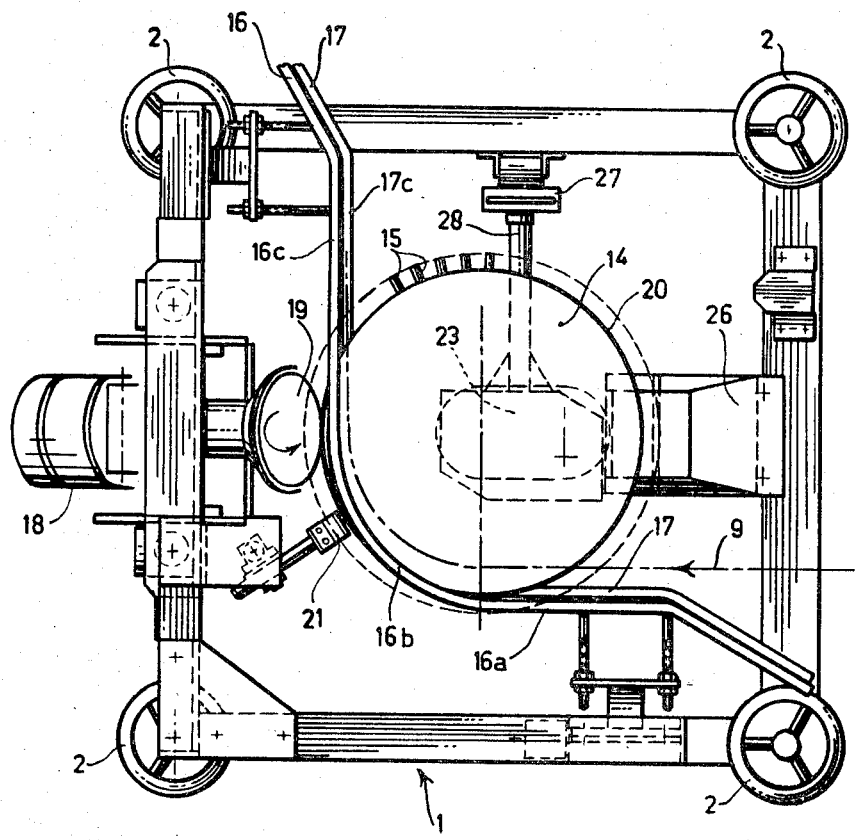

3,548,448
DEVICE FOR CUTTING THROUGH THE ANKLE JOINT OF A LEG OF A BIRD HANGING BY THIS LEG
Jacobus Gerardus Vertegaal, Boxmeer, Netherlands, assignor to Stork Amsterdam N.V., Amsterdam, Netherlands
Filed Dec. 10, 1968, Ser. No. 782,644
Claims priority, application Netherlands, Oct. 21, 1968, 6815015
Int. Cl. A22c 21/00
U.S. Cl. 17—11
6 Claims

ABSTRACT OF THE DISCLOSURE

A device for cutting the ankle joint of a leg of a bird comprises a rotating guide disc which cooperates with a rotating cutting disc, and curved guide rods placed both above and beneath the guide disc at the outer edge thereof for guiding and bending the legs of the bird at the location of the joint between the guide rods and the guide disc so that the joint can be cut by means of the cutting disc.

My invention relates to a device for cutting through the ankle joint of a leg of a bird suspended by this leg, which device cooperates with a conveyor track, disposed thereabove and provided with shackles from which the legs of the birds to be treated are suspended, and comprising a guide disc which synchronously with the conveyor is driven in rotation and which cooperates with a rotating cutting disc.

Such a device is known from the British Pat. 1,080,608. In this known device a guide disc is used which on its circumferential edge is provided with a groove situated perpendicular to the axis of the disc and engaged by the side of a cutting disc situated at the some level as the guide disc and parallel thereto. A positioning disc provided with projections on its circumference is disposed under the guide disc by means of a sliding sleeve and the positioning disc cooperates with a guide belt therealong and running over guide sprockets. The combination of these rotating members serves to position the bird correctly with respect to the cutting and guide-disc.

Although this known device operates satisfactorily, it has the drawback that as a whole it is rather complicated. It is therefore an object of my invention to provide a device of the kind mentioned hereinbefore which has a much simpler construction while maintaining the proper effect.

The device according to my invention is characterized in that both above and below the disc and in the proximity of the edge thereof a guide rod is provided extending through approximately a quarter of the circumference of the disc, the guide rods each comprising both an inlet part, a substantially part-circular intermediate part and a straight outlet part which is substantially at right angles to the inlet portion, the latter being situated inside the outer edge of the guide discs, the arrangement being such that the legs of the birds at the location of the joint to be cut through are guided and bent between the guide rods and the disc, a rotating cutting disc being disposed in the vicinity of the transition part from the intermediate part to the outlet part, the cutting edge of the disc reaching the vicinity of the surface of the guide disc at a short distance from the outer edge thereof, the center line of the cutting disc enclosing an acute angle with the center line of the guide disc.

When the legs of the bird are introduced at the right level beween the guide disc and the guide rods the joint of the bird is at the level of the upper edge of the guide disc, the leg of the bird being bent on the guide disc by the guide rods.

The joint is then, when it arrives at the location of the cutting disc, in the right place and in the right position to be cut through.

Provided in the guide disc close to the outer edge thereof and in the surface which is directed to the cutting disc, is a circumferential groove which can receive the cutting edge of the cutting disc. The cutting edge is then below the level of the upper surface of the guide disc so that complete severance of the leg is ensured and it does not remain attached by skin.

The lower guide rod is preferably closer to the centre of the guide disc than the upper guide rod, whereby the point at which the straight inlet part of the upper guide rod merges into the curved intermediate part is situated outside the guide disc, whereas the point at which this intermediate part merges into the straight outlet portion is situated inside the guide disc.

A knife for a preliminary cutting operation is positioned between the guide rods preferably before the cutting disc in the direction of movement of the bird. Before the joint arrives at the cutting disc, the sinews on the outer side of the joint are cut through by the aid of this knife, whereby the joint opens and can be more easily positioned and more exactly severed.

The guide disc is supported in an oblong guide member the two ends of which are connected with intermediate pieces which are substantially transverse to the longitudinal axis of the guide member and which at a distance from the guide member can rotate around an axis crossing the longitudinal axis of the guide member.

This is advantageous in that the guide member, on turning away from the guide disc not only moves away from the cutting disc but moreover performs a downward movement, so that especially in the embodiment with a groove in the upper face of the guide disc the cutting disc can disengage itself from this guide disc. In the turned-away position of the guide disc the whole passage is left clear so that when the device is to be put out of action, for instance for the handling of another kind of poultry, this poultry can freely pass through this leg cutting station.

A more complete understanding of my invention, and of further objects and features thereof can be obtained from the following description of illustrative embodiments thereof, when considered in connection with the accompanying drawing, wherein:

FIG. 1 is a side elevation of a device according to the invention, only the essential parts being depicted; and
FIG. 2 is a plan view of the device.

The device comprises a frame 1 supported by four legs 4 which are adjustable in height by means of the hand wheels 2 and the screw spindles 3.

The birds to be handled, which have already been pretreated, are supplied to the device hanging on the conventional shackles 6. These shackles are suspended from a conveyor track 7 which at the location of the device passes over a sprocket wheel 8. The path of the birds through the device is indicated by the arrow 9 in FIG. 2.

The sprocket wheel 8 drives a guide disc 14 via an intermediate shaft 10 two universal joints 11, 12, respectively, and a coupling disc 13. This guide disc therefore rotates synchronously with the movement of the conveyor. This disc is provided with a number of radially protruding guide fingers 15 disposed on its under face, only a limited number of which are represented in FIG. 2. The guide fingers are provided in such a way on the disc that the fingers come to lie behind the legs, taking into account the pitch of the shackles 6—determining the distance between the legs—and the spacing of the shackles 6 on the conveyor track.

The angular position of the coupling disc 13 with respect to the guide disc 14 is adjustable, so that the mutual position can be adjusted in such a way that when a bird hanging on the conveyor arrives at the guide disc, the legs are grabbed by adjacent pairs of guide fingers.

Guide rods 16, 17, respectively are disposed both above and below the disc 14. As illustrated in FIG. 2, each guide rod has a substantially straight extending inlet part 16a, 17a, respectively, an intermediate part 16b, 17b, respectively extending through a quarter of a circle and an adjoining straight outlet part 16c, 17c, respectviely, extending at right angles to the inlet part. The ends of the inlet and the outlet part are outwardly bent over.

Disposed in the proximity of the transition part between the curved portion and the end part of the guide rods is a cutting disc 19 driven by a motor 18. In operation, the lower edge of the cutting disc reaches into a shallow groove 20 formed in the guide disc 14 in the vicinity of the outer edge thereof. The motor 18 is secured to the frame 1 in such a way that the angular position of the cutting disc can be adjusted at will with respect to the guide disc.

In the direction of movement of the birds is a cutter disc 21, the purpose of which will be described hereinafter, said disc 21 being arranged before the cutting disc 19.

The guide disc 14 is supported in an oblong bearing bush 22 which at its upper and lower end, via connecting members 23, 24 respectively is connected with the upper, lower end, respectively of a carrier 25 which via a corner piece 26 is held by the frame 1. The longitudinal axis of the carrier 25 is slightly inclined; the entire construction is arranged such that the bearing bush 22 can turn around the axis of the carrier 25. As a consequence, after disengaging a locking arrangement 27 on a locking rod 28 connected with the bearing bush 22, the bearing bush together with the guide disc 14 can be moved away from the guide rods. Due to the oblique placement of the carrier 25 the bearing bush 22 and consequently the guide disc 14 will not only be swung aside during this movement, but it will also move downwardly over a small distance to disengage the cutting disc 19 from the groove 20.

The device operates in the following manner:

The birds, which are hanging on the shackles 6, are supplied by the conveyor and their legs are engaged between the guide fingers 15 provided on the guide disc and are thereby carried along therewith. At the location where the straight inlet parts 16a, 17a respectively of the guide rods 16, 17 respectively merge into the curved transition part 16b, 17b respectively the distance between the guide rods and the center of the guide disc becomes smaller. The legs of the birds to be treated are thus bent on the guide disc, whereby, when the shackles are at the right level, the joint to be cut through is at the level of the upper edge of the guide disc. By the aid of a cutter disc 21 the outermost sinews are first cut through, whereby the joint opens (the ball is released from the socket), whereupon the joint is then cut through by the cutting disc 19. Due to the presence of the groove 20 in the guide disc 14, and the edge of the cutting disc reaching as far as the bottom of the groove, it is ensured that also the skin of the bird is cut through and the legs as a consequence are entirely separated from the rest of the bird. The bird itself then falls into the receptacle 29 disposed thereunder.

While preferred embodiments of the invention have been shown and described, it is to be understood that changes and variations may be made without departing from the spirit and scope of the invention as defined in the appended claims.

What I claim is:

1. A device for cutting through the ankle joint of a leg of a bird suspended by this leg, which device cooperates with a conveyor track, disposed thereabove and provided with shackles from which the legs of the birds to be treated are suspended, a guide disc being driven in rotation synchronously with the conveyor cooperating with a rotating cutting disc to cut through the leg of a bird, an improvement comprising a guide rod above and below the disc and in the proximity of the edge thereof, each rod extending through approximately a quarter of the circumference of the disc and comprising an inlet part, a substantially curved intermediate part and a straight outlet part which is at right angles to the inlet part, the latter parts being situated at least in part inside the outer edge of the guide disc such that the legs of a bird at the location of the joint to be cut through are guided and bent between the guide rods and the disc, the rotating cutting disc being disposed in the vicinity of the transition between the intermediate part and the outlet part and having a cutting edge reaching to the vicinity of the surface of the guide disc at a short distance from the outer edge thereof, the cutting disc being inclined at an acute angle to the guide disc.

2. A device according to claim 1, wherein a circumferential groove which can receive the cutting edge of the cutting disc is provided in the guide disc close to the outer edge thereof and in the surface which faces the cutting disc.

3. A device according to claim 1, wherein the lower guide rod is closer to the center of the guide disc than the upper guide rod.

4. A device according to claim 1 wherein the point at which the straight inlet part of the upper guide rod merges with the curved intermediate part thereof is situated outside the guide disc, whereas the point at which this intermediate part merges with the straight outlet part is situated inside the guide disc.

5. A device according to claim 1 comprising a knife positioned between the guide rods and arranged before the cutting disc in the direction of movement of the bird.

6. A device according to claim 1 comprising an oblong guide member supporting the guide disc, said oblong guide member having a longitudinal axis and two ends, intermediate pieces extending substantially transverse to the longitudinal axis of the guide member and connected to said ends of the guide member, and means supporting the intermediate pieces for pivotal movement about an axis which is inclined to the longitudinal axis of the guide member.

References Cited
UNITED STATES PATENTS

| 2,846,718 | 8/1958  | Sengelaub     | 17—11 |
| 3,038,197 | 6/1962  | Turner        | 17—11 |
| 3,199,143 | 8/1965  | Ousley        | 17—11 |
| 3,213,488 | 10/1965 | Volpe         | 17—11 |
| 3,323,164 | 6/1967  | Bonuchi et al.| 17—11 |
| 3,364,515 | 1/1968  | Brown et al.  | 17—11 |
| 3,405,423 | 10/1968 | Vertegaal     | 17—11 |

ALDRICH F. MEDBERRY, Primary Examiner

U.S. Cl. X.R,

17—24